Patented Oct. 28, 1941

2,261,021

UNITED STATES PATENT OFFICE 2,261,021

RECOVERY OF HALOGENS FROM FLUIDS

Donald M. Findlay, Passaic, N. J., assignor, by mesne assignments, to United States Rubber Company, New York, N. Y., a corporation of New Jersey No Drawing. Application August 24, 1938, Serial No. 226,586

2 Claims. (Cl. 23—87)

This invention relates to the removal of free halogens from fluids containing the same, and more particularly to the removal and recovery of iodine from iodine-containing solutions, by the employment of anion-exchanging synthetic resins made by reacting aryl bodies with methylene bodies.

According to the present invention it has been found that fluids (gaseous or liquid) and particularly aqueous solutions containing free elemental halogens, such as chlorine, bromine, or iodine, as distinguished from their salts, can have removed therefrom almost quantitatively the halogen, if the solution is passed over such a synthetic resin, particularly one resulting from condensing a methylene body with an amino aryl body such as a phenylene diamine.

A resin particularly suitable for the present process may be made by dissolving 100 g. of metaphenylene diamine in 100 g. of 35% hydrochloric acid and adding thereto 300 g. of cracked ice. After thorough mixing, 150 g. of 40% formaldehyde is added with constant stirring and the cooled mixture is poured into a shallow tray where it soon sets to a brittle resin which can be broken up and dried at about 100° C. The dried resin may then be ground to any suitable degree of fineness.

The following example is given to illustrate the invention:

Example.—To 45 g. of a resin made as described above enough water is added to wet and swell the resin. The swollen resin is placed in a glass absorption column. 45 g. of the resin made as described above and thoroughly wetted with water will occupy a space of about 100 cubic centimeters. The resin is washed with 1 normal sodium carbonate solution until free from chloride. A saturated water solution of iodine is allowed to pass through the resin bed in the absorption tower until the resin is saturated with iodine. This saturation will be evidenced by the appearance of free iodine in the effluent from the absorption tower. I have found that 45 g. of resin will absorb approximately 80 g. of iodine before any free iodine appears in the effluent. The iodine which is absorbed by the resin may be recovered by passing over the resin an alkaline solution of a suitable reducing agent, e. g. sodium sulphite. By washing the saturated resin bed thoroughly with a solution of sodium or potassium sulphite the iodine may be recovered from the resin almost quantitatively as sodium or potassium iodide.

An alternative method of recovery comprises the passing of SO₂ gas through the wet resin bed, followed by a washing with a sodium carbonate solution. This process also results in the almost quantitative recovery of the iodine from the bed as iodide.

The usual method of recovering sorbed materials from resins capable of adsorbing anions, viz., passing over the bed sodium carbonate or a similar alkali, will result in this case in the recovery of only 50% of the iodine associated with the resin. The use of a reducing agent is essential for the recovery of the total amount of iodine present with the resin.

While I do not wish to be limited to any particular explanation or theory, I believe that the sorption of iodine and its subsequent recovery by the use of alkaline reducing agents may be explained by the following considerations.

In the ordinary process of halogenation of aryl bodies by substitution, one mole of halogen acid is formed for each gram atom of halogen added to the ring, as illustrated in the following formula for the halogenation of benzene.

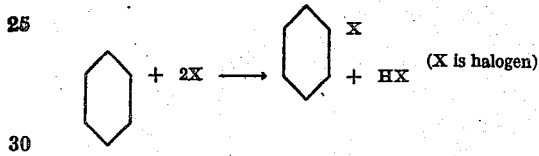

In the case of iodination, this reaction proceeds with great difficulty since the hydrogen iodide formed is a reducing agent and shows a great tendency to reduce the resulting aryl iodide. Iodinations can only be carried out providing the hydrogen iodide is removed from the zone of reaction. It is known that iodine will add to metaphenylene diamine readily according to the following scheme.

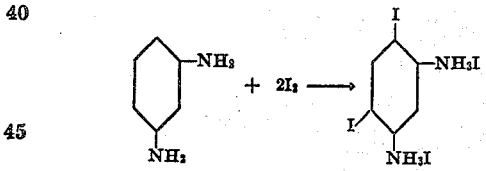

This would indicate that in the case of the metaphenylene diamine resin one-half of the iodine may be associated with the resin and may be tied up with the ring and the other half associated with the amino groups in the form of negative iodide ion. Thus, to remove the iodine completely from the resin, it is necessary not only to remove the negative iodide ion, which is sorbed in the same manner as any other negative ion on an anion-exchange resin, but also to reduce the iodine atom associated with the aryl nucleus to iodide ion. This, I believe, explains why the use of an alkali without a reducing agent results in the recovery of only one-half of the iodine associated with the resin.

While the above refers only to the sorption and recovery of iodine, the sorption step can be carried out with other halogens than iodine. Resins made by reacting either metaphenylene diamine or phenol sulphonic acid with formaldehyde will react with and remove chlorine and bromine from aqueous solution, presumably by the chlorination or bromination of the aryl nucleus.

The process of recovery with the use of reducing agents works practically only as to iodine, possibly due to the fact that chlorine and bromine substituted aromatic compounds are fundamentally more stable than the corresponding iodine compounds.

Instead of water soluble inorganic sulphites other reducing agents may be used, for example, sulphur dioxide, sulphurous acid, water soluble inorganic bisulphites, etc. Washing with an aqueous alkaline solution during or after the reduction, allows recovery of most of the iodine previously associated with the resin, in the form of an iodide salt.

The process may be used to recover iodine from non-alkaline neutral or acid iodine-containing aqueous solutions, for example, from various waste liquors containing the iodine, and particularly where iodine or iodide catalysts have been used in organic reactions, as well as from brines containing dissolved iodide. In the latter instance, the iodide is first converted to free iodine as by the action of chlorine or by other known methods, and then the iodine is removed by the present process.

Examples of other resins that may be used are the resins made by reacting formaldehyde with aniline, meta toluidine with formaldehyde, meta toluylene with formaldehyde, etc. In place of formaldehyde there may be used acetaldehyde, polymerized aldehydes such as paraformaldehyde, paraldehyde, furfuraldehyde, etc.

Having thus described my invention, what I claim and desire to protect by Letters Patent is:

1. A process for removing and recovering iodine from non-alkaline aqueous solutions containing free elemental iodine which comprises subjecting the solution to the action of a synthetic resin obtained by the condensation of meta phenylene diamine with formaldehyde, until at least a portion of the iodine is removed from said solution, and thereafter subjecting the resin to the action of a reducing agent capable of effecting the removal of chemically combined iodine from the resin and an alkaline solution whereby the greater portion of the iodine previously chemically associated with the resin is removed in the form of iodide ion.

2. A process for removing and recovering iodine from non-alkaline aqueous solutions containing free elemental iodine which comprises subjecting the solution to the action of a synthetic resin obtained by the condensation of meta phenylene diamine with formaldehyde, until at least a portion of the iodine is removed from said solution, and thereafter subjecting the resin to the action of an alkaline solution of a water soluble inorganic sulphite whereby the greater portion of the iodine previously associated with the resin is removed in the form of iodide ion.

DONALD M. FINDLAY.